March 28, 1967 F. C. SCHWARZ 3,311,808

SELF-STABILIZING PULSE DURATION MODULATION AMPLIFIER

Filed Dec. 17, 1962 2 Sheets-Sheet 1

Inventor:
Francisc C. Schwarz,
by D. T. Ready
His Agent.

SELF-STABILIZING PULSE DURATION MODULATION AMPLIFIER

Filed Dec. 17, 1962 2 Sheets-Sheet 2

Inventor:
Francisc C. Schwarz,
by [signature]
His Agent.

3,311,808
Patented Mar. 28, 1967

3,311,808

SELF-STABILIZING PULSE DURATION MODULATION AMPLIFIER

Francisc Carol Schwarz, Ithaca, N.Y., assignor to General Electric Company, a corporation of New York Filed Dec. 17, 1962, Ser. No. 245,059
3 Claims. (Cl. 321—45)

This invention relates to circuits which, when energized by an unregulated power source, deliver power to a resistive or reactive load that is characterized by a constant volt-time integral input-output relationship in spite of substantial variations in conditions such as source voltage, temperature and load impedance. These circuits inherently provide a self-stabilized pulsed output and therefore are particularly advantageous as D.C. to A.C. inverters. However, the invention is easily adapted to various operating modes such as D.C. to D.C. and A.C. to A.C. by suitable input and output circuits. These circuits are highly efficient and can be used in applications requiring power measured in watts or kilowatts at frequencies from cycles to thousands of kilocycles.

In conventional magnetic amplifiers, regulation is generally obtained by the effect of a saturable reactor arranged in series with the load and the power source. The saturable reactor operates periodically as a series switch, being effectively open when in an unsaturated (high impedance) condition and being effectively closed in a saturated (low impedance) condition. The magnetic amplifier regulates the output essentially by adjusting the relative time of the ON or low impedance, saturated condition of the saturable reactor. However, the saturated condition is determined by the characteristics of the saturable reactor so that variations in the voltage level of the power source or in the magnetic characteristics of the saturable reactor due to changes in conditions such as temperature are not generally compensated.

Furthermore, conventional magnetic amplifiers generally have a practical upper frequency limit of 400 c.p.s. for efficient operation. Higher frequencies usually result in intolerable power losses in the series connected saturable reactors. This in turn leads to substantial requirements for large inductances of substantial size and weight to filter the output at the low frequencies.

Accordingly, it is an object of this invention to provide an amplifier having a fixed average output voltage level or a varying output voltage level as the function of a time varying input signal which incorporates the advantages of magnetic amplifiers without relying upon a saturable reactor to be the series power switching element.

It is a further object of the invention to provide an amplifier which is self-stabilizing in respect to line voltage so that the output voltage is substantially constant in spite of ripple or other variations in the source voltage.

It is also an object of the invention to provide an amplifier which is self-stabilizing in respect to variations in line frequency and is insensitive to changes in the characteristics of the volt-time integrator.

Another object of this invention is to provide a device that inverts D.C. to regulated A.C. and whose average output voltage can be controlled.

Briefly stated, in accordance with certain aspects of the invention, a pair of volt-time integrators are arranged to cyclically control the duration of the application of power to a load. A pair of series switching elements, such as transistors or controlled rectifiers, are arranged between the power source and the load. A reference oscillator producing a square wave signal, which is differentiated, initially turns ON the transistors during alternate half cycles. The volt-time integrators, which can be saturable transformers, are then energized by these pulses and hold the transistors ON until the integration limit is reached. The transistors are conveniently connected to the load through a transformer so that pulses of opposite polarities are successively applied to the load where they can be rectified and/or filtered as desired. However, because of the arrangement of the volt-time integrators, the power applied to the load is stabilized by proportionate volt-time integration to compensate for variations in the power source such as voltage level changes and for variations in the load condition.

Although the invention is described in terms of volt-time integration, it is to be understood that circuits operating with ampere-time integration will have analogous characteristics.

These and other objects and features of the present invention will become apparent from the accompanying detailed description and drawings in which.

Figure 1:
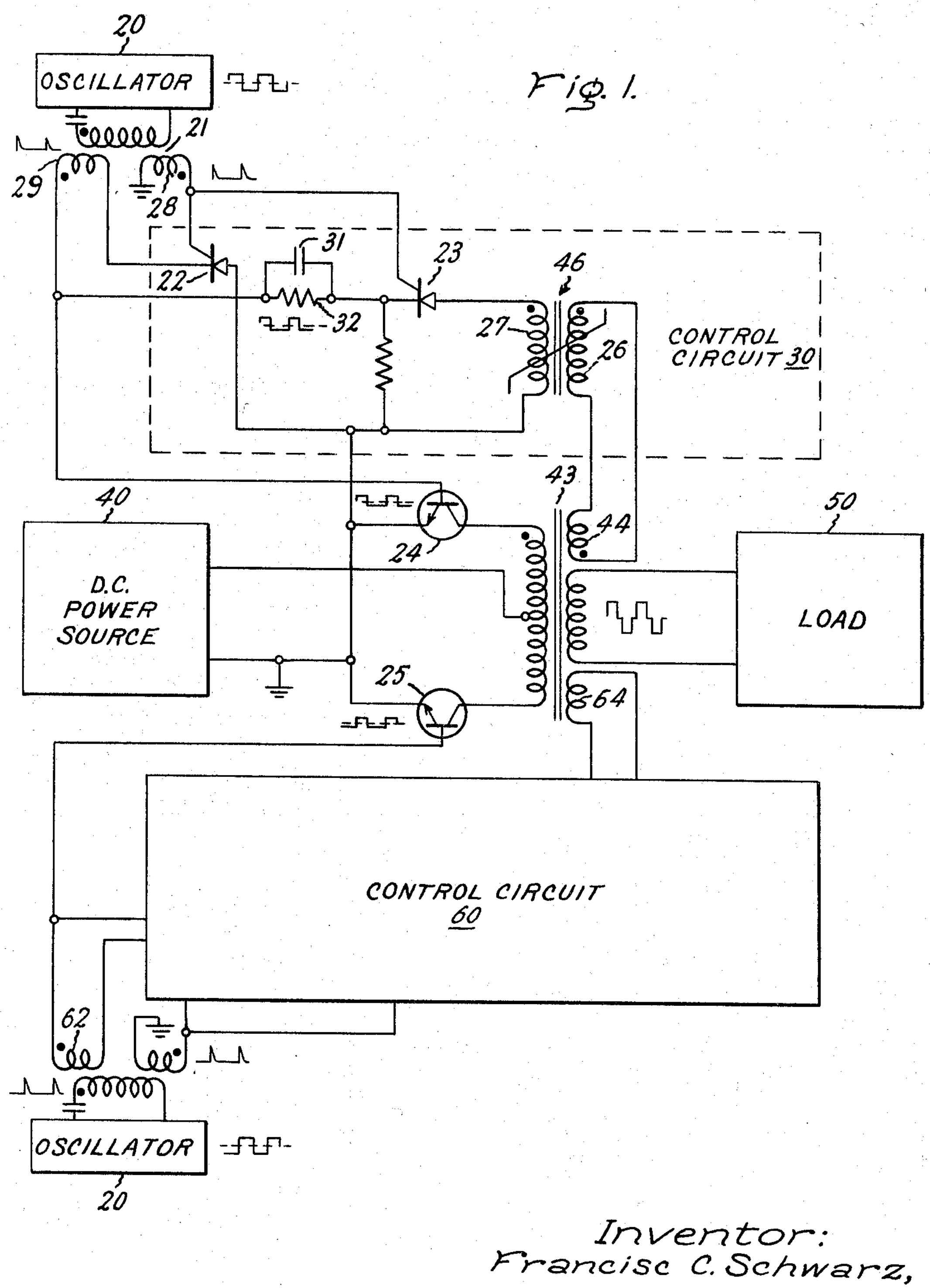
FIGURE 1 is a schematic diagram of a first embodiment of the invention.

Referring now to the drawings, FIGURE 1 is a schematic diagram of one form of the invention. A D.C. power source 40 is coupled to a load 50 through a balanced transformer 43 and a pair of switching transistors 24 and 25. The switching transistors modulate the power applied to the load as controlled by signals from control circuits 30 and 60 which are responsive to the average voltage actually delivered to the load 50. The control circuits 30 and 60 switch respective transistors 24 and 25, ON and OFF alternately at a frequency determined by a square wave oscillator 20 and with an ON duration determined by the integrated, volt-time integral of the voltage actually applied to the load by means of a saturable transformer 46.

The control circuits 30 and 60 are feedback-like circuits which receive signals proportional to the load voltage from secondary windings 44 and 64 of transformer 43. The feedback signal from winding 44 is applied to saturable transformer 46. The switching transistor 24 is maintained ON by the feedback signal derived from the positive voltage induced in the winding 26 of the saturable transformer 46. However, this signal terminates when the saturable transformer is saturated at its integrated, volt-time limit. With the negligible flux change above this limit, the induced voltage is substantially zero so the switching transistor 24 turns OFF. In this manner, the ON time of the positive half cycle is determined. The positive half cycle is initiated by the differentiated leading edge of a positive half cycle of the square wave from oscillator 20 which through pulse transformer 21 turns the switching transistor 24 ON.

The negative half cycle of the power applied to the load is controlled in the same manner as the positive half cycle. It is initiated by the differentiated leading edge of a negative half cycle from oscillator 20, as applied to pulse transformer 62, which turns switching transistor 25 ON. With the negative voltage applied to the load, a feedback signal from winding 64 is applied to transistor 25 through control circuit 60 to hold it ON for a duration determined by a saturable transformer in the same manner as control circuit 30, by volt-time integration of the feedback signal.

FIGURE 1 illustrates further details of the control circuit 30 which are required to insure reliable operation. The functions involved include: the resetting of saturable transformer 46; the sharp turn off of transistor 24; and the protection from premature turning ON of switching transistor 24 at the termination of the negative half cycle by the transient signal induced in winding 44 when transistor 25 turns OFF.

Saturable transformer 46 is reset during the negative half cycle by the signal induced in winding 44. Saturable transformer magnetic characteristics are such that the full saturation level tends to be reached asymptotically. Since this is the turn OFF point of the switching transistor, it is desirable to sharpen this cut-off point. The turn-OFF of transistor 24 is reinforced by the parallel RC circuit, consisting of resistor 32 and capacitor 31, which is connected in series with base of transistor 24. While the voltage induced on winding 27 is holding transistor 24 ON, a voltage is developed across resistor 32 which charges capacitor 31. When the transistor hold voltage drops, as saturation is approached, capacitor 31 acts as negative current source assisting in switching transistor 24 OFF.

To avoid triggering of switching transistor 24 prematurely and to isolate the oscillator square wave signal from the switching transistor 24 after the initiation of the positive cycle, controlled rectifiers 22 and 23 are provided. Rectifier 22 is connected in series with the oscillator pulse transformer winding 29 which supplies the signal to turn transistor 24 ON. It is controlled by a signal from a second winding 28 on transformer 21. When the differentiated square wave goes positive, controlled rectifier 22 is fired and permits the turning ON of switching transistor 24. However, when the feedback signal becomes effective to hold transistor 24 ON, current no longer flows through the controlled rectifier 22 and it turns itself OFF. When the holding signal for the square wave signal is positively blocked, the OFF state of controlled rectifier 22 is maintained by the discharge current from capacitor 31. The controlled rectifier 22 therefore isolates transistor 24 from any switching signals through winding 29 during the negative half cycle. Controlled rectifier 23, in series with winding 27 of the saturable transformer 46, is fired in parallel with rectifier 22 from oscillator 20 through winding 28. It therefore passes the holding signal for switching transistor 24 which keeps the rectifier conducting until the transistor is turned OFF. During the negative half cycle, it is nonconducting and isolates the switching transistor 24 from feedback signals due to overshoots.

The inputs to the volt-time integrators are not true feedback signals in the usual sense. These signals are proportional to the voltage applied to the load but do not directly reflect actual response of the load. However, these signals do regulate the power applied to the load by integrating the reflected input power source voltage. Also, in the preferred embodiments, the integration is performed after the modulation circuitry, including the switching transistors and the transformer.

The control circuit 30 can be utilized for other amplifiers which require analogous switching signals.

Figure 2:
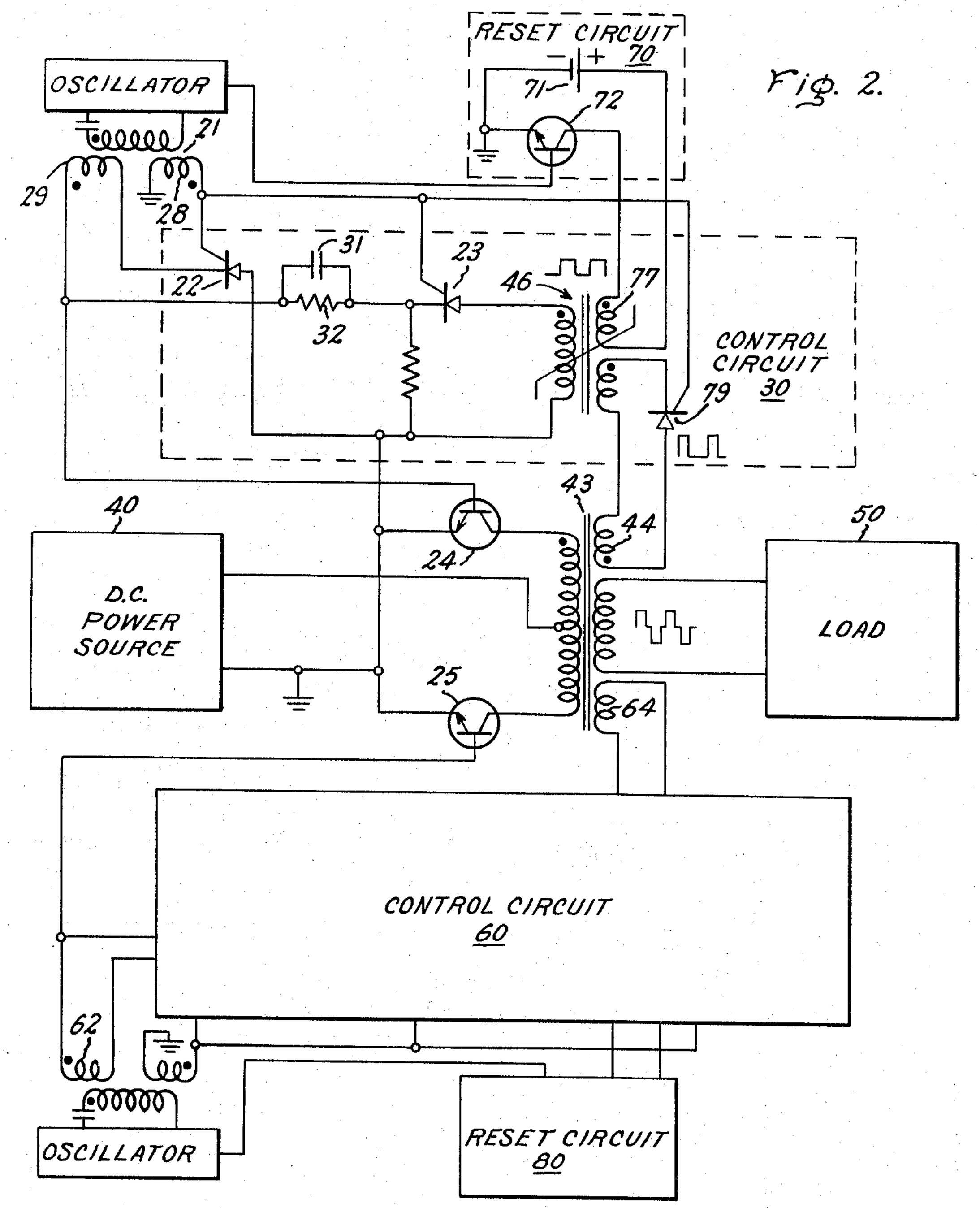
FIGURE 2 is a schematic diagram of an improvement of the embodiment of FIGURE 1.

FIGURE 2 illustrates a second embodiment of the invention which is an improvement over the FIGURE 1 embodiment. The FIGURE 2 circuit accordingly incorporates the same circuitry, represented with the same reference characters, and a more accurate arrangement for fixing the volt-time integration. In the FIGURE 1 circuit, the volt-time integral is determined by the saturation level of the saturable transformer 46. When the reset signal drives the saturable transformer to saturation in one direction, the volt-time integral is determined directly by the integration of the feedback signal which drives the transformer to saturation in the other direction. It is evident that variations in the saturation characteristics of the saturable transformer will result in variations in the volt-time integral. To obviate such effects and to enable simple adjustment of the circuit, a precision reset circuit 70 is provided.

To permit reset control be reset circuit 70, a controlled rectifier 79 is placed in the feedback connection from winding 44 to saturable transformer 46. This rectifier is fired in parallel with controlled rectifier 23 and therefore passes feedback signals for volt-time integration, but it isolates transformer 46 from the feedback winding during the negative half cycle. Resetting of saturable transformer 46 is performed by winding 77 which applies a reset voltage signal from reset circuit 70 during the negative half cycle. The reset circuit is comprised of a precision D.C. voltage source 71 and a switching transistor 72 in series with the winding 77 on saturable transformer 46. The switching transistor is coupled to the square wave oscillator which turns it ON for the negative half cycle. Component values for the circuit are selected such that the saturable transformer 46 only saturates in one direction, at the termination of the hold period for switching transistor 24.

The reset signal does not drive the reactor to saturation in the opposite direction. As a result, the reset circuit provides a precise standard which is the volt-time integral of the voltage source 71 over the negative half cycle of the square wave oscillator and which is not affected in its operation by temperature variations. For a physically given reactor, the effects of temperature variations in the flux density (B) versus magnetization (H) relationship are eliminated by exclusive application of voltage sources. In the FIGURE 2 circuit, the saturable transformer 46 serves as a storage device for the volt-time standard as opposed to serving as the standard itself as in the FIGURE 1 circuit. Another major characteristic of the FIGURE 2 circuit is that it inherently corrects for varations in frequency of the square wave oscillator 20. When the square wave frequency varies, the ON time, in each cycle, of switching transistor 72 is varied inversely so that the volt-time integral of the reset reference is varied inversely. Therefore, the product of the square wave frequency and the reset volt-time integral of each cycle is invariant.

The circuits of FIGURES 1 and 2 present preferred inverter embodiments of the invention. There are wide variations in the mode of implementation. For example, the particular switching components illustrated are only representative. Although controlled rectifiers are preferred because of their high efficiency, other switching components can be utilized. More significant variations include the substitution of different integrators for the saturable transformer. For example, RC integrators where the charging capacitor characteristic is made linear by boot-strapping or operational amplifier techniques can permit operation in megacycle range.

One of the major characteristics of the invention is that it provides pulses of fixed average voltage to a load, by stabilization in accordance with the volt-time integral of the voltage delivered. There are therefore substantially no restrictions on the characteristics of the source and variations in the average voltage level can easily exceed twenty-five percent while the output average can remain constant within one percent or even lower.

When the self-stabilizing amplifier is used for applications where the output is to be filtered for wave shaping and/or rectification, it is preferable to use a square wave oscillator having a frequency of several kilocycles or more. This permits the use of inductances of relatively small values in the filter circuits which result in inductors of substantially smaller size and weight and therefore provides significant savings in the overall system requirements.

While particular embodiments of the invention have been shown and described herein, it is not intended that the invention be limited to such disclosure, but that changes and modifications can be made and incorporated within the scope of the claims. For example, the saturable transformers can be replaced with saturable reactors with appropriate changes in the circuitry to provide operation of the reactors exclusively by voltage sources or exclusively by current sources. Also, in the embodiment of FIGURE 2, the D.C. reference source 71 can be replaced by a source of amplitude modulated signals which transforms the reset circuit 70 into a modulator circuit.

What is claimed is:

1. A self-stabilizing amplifier comprising:

(a) a pair of semiconductor switching elements, each switching element being arranged in series between a power source and a load circuit to control the duration of applied power during alternate half cycles;

(b) a control circuit for each of said switching elements including a saturable transformer coupled to the load circuit to receive a fixed proportion of the instantaneous voltage applied to the load and to apply a turn OFF signal to one of said switching elements;

(c) means coupling a reference oscillator signal to initially turn said switching elements ON;

(d) reset means for each of said saturable transformers including a reference D.C. voltage source for providing resetting of these integrators during the half cycles when the corresponding switching element is open; and (e) switching means coupled to each of said control circuits for isolating said control circuits from said load circuit during their reset half cycles.

2. An amplifier comprising:

(a) an amplifier stage coupling a source of electrical signals to a load;

(b) switching means in said amplifier stage for modulating the signal applied to the load;

(c) a control circuit for at least one of said switching means to provide the desired modulation;

(d) integrating means in said control circuit for cyclically producing the control signals for said switching means;

(e) reset means for applying a reference D.C. signal to said integrating means to provide an accurate integration standard during reset by integration over a fixed time period; and (f) feedback means, including second switching means, for feeding back a signal proportional to the instantaneous load voltage except during reset.

3. A self-stabilizing amplifier comprising:

(a) a balanced transformer coupled between a load and a power source;

(b) a pair of semiconductor switching elements, each switching element being arranged in series between the power source and said transformer to control the duration of applied power during alternate half cycles;

(c) a control circuit for each of said switching elements including a saturable transformer coupled to said balanced transformer to receive a fixed proportion of the instantaneous voltage applied to the load, said saturable transformer providing a signal to hold said switching element ON during volt-time integration and applying a turn OFF signal to said switching element at saturation;

(d) means coupling a reference oscillator signal to each said control circuit to turn said semiconductor switches ON during alternate oscillator half cycles;

(e) reset means for each of said saturable transformers including a reference D.C. voltage source for providing resetting of these integrators during the half cycles when the corresponding switching element is open;

(f) switching means, coupled to the reference oscillator, for connecting said reference voltage to said reactors during reset half cycles;

(g) switching means isolating said saturable transformer from spurious signals during the responsive to the reference oscillator signal during the respective reset half cycles of each control circuit.

References Cited by the Examiner

UNITED STATES PATENTS

| | | | |
|---|---|---|---|
| 2,774,878 | 12/1956 | Jensen | 321—44 |
| 3,030,589 | 4/1962 | Kadri | 321—45 |
| 3,078,380 | 2/1963 | Ingman | 321—45 |
| 3,161,837 | 12/1964 | Lloyd. | |
| 3,219,906 | 11/1965 | Keller et al. | 321—16 |

OTHER REFERENCES

"Reducing Spikes in D.-C. to D.-C. Converter Outputs," by C. J. Biggerstaff, pp. 64–65 of Electronics, Oct. 20, 1961.

JOHN F. COUCH, *Primary Examiner.*

LLOYD McCOLLOM, *Examiner.*

J. M. THOMSON, W. M. SHOOP, *Assistant Examiners.*